J. A. FRAUENHEIM.
BOLT.
APPLICATION FILED MAY 15, 1915.
1,228,199.
Patented May 29, 1917.
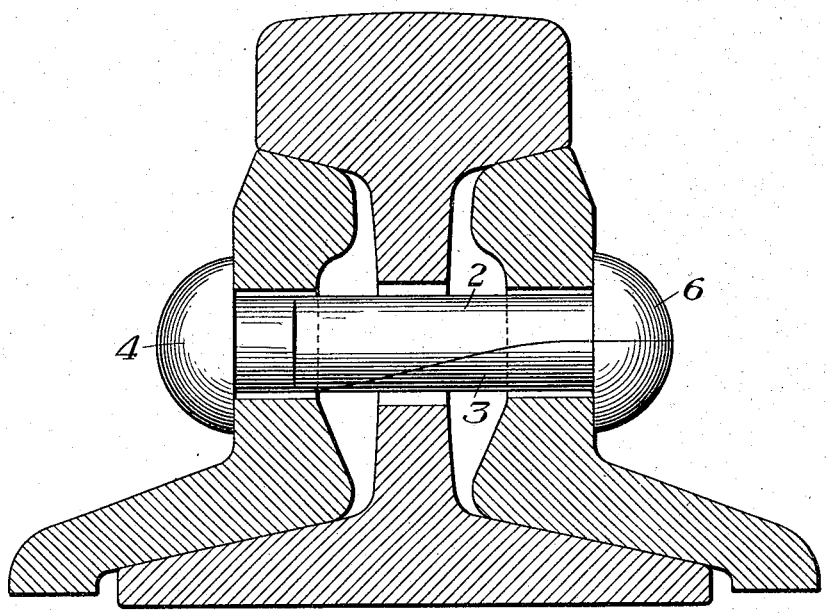
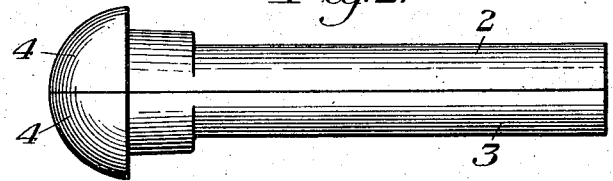
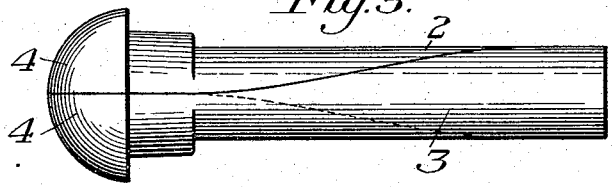
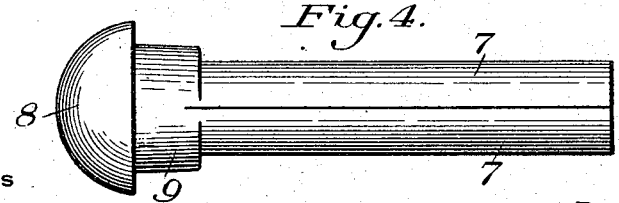
WITNESSES
R. A. Balderson
Jesse B. Heller
INVENTOR
J. A. Frauenheim
by Bakewell, Byrnes & Parmelee
attys.

UNITED STATES PATENT OFFICE.

JOSEPH A. FRAUENHEIM, OF PITTSBURGH, PENNSYLVANIA, ASSIGNOR TO KERNER MANUFACTURING COMPANY, OF PITTSBURGH, PENNSYLVANIA, A CORPORATION OF PENNSYLVANIA.

BOLT.

1,228,199.  Specification of Letters Patent.  Patented May 29, 1917.

Application filed May 15, 1915. Serial No. 28,298.

*To all whom it may concern:*

Be it known that I, JOSEPH A. FRAUEN-HEIM, a citizen of the United States, residing at Pittsburgh, in the county of Allegheny and State of Pennsylvania, have invented a new and useful Improvement in Bolts, of which the following is a full, clear, and exact description, reference being had to the accompanying drawings, forming part of this specification, in which:

Figure 1 is a sectional view showing one of my improved bolts applied to a rail joint.

Fig. 2 is a plan view of the assembled bolt before twisting.

Fig. 3 is a similar view after twisting, and

Fig. 4 is a view similar to Fig. 2, but showing a modification.

My invention has relation to bolts and is designed to provide a bolt formed of a plurality of members which are capable of a limited movement relatively to each other under stress, and which also possess considerable elasticity, whereby permanent stretching is reduced to a minimum.

My invention is especially applicable to track bolts, but the bolts may be used for a variety of other purposes where a solid head can be used at each end.

Referring to the accompanying drawings, in which I have shown the preferred embodiment of my invention, and which will now be described, the numerals 2 and 3 designate counterpart members of which the bolt is formed. In the construction shown in Figs. 1, 2 and 3, and which is preferred, the members are entirely separate from end to end. Each member is of semi-cylindrical form in cross section with a half-head 4 thereon, so that when assembled they form a complete bolt. After being assembled, as shown in Fig. 2, the members are then twisted upon each other to a greater or less angle, preferably about ninety degrees, as shown in Fig. 3.

Or, the members may be separately twisted during their formation by means of suitable forming dies, so that when assembled they form a helically twisted body. In other words, the members 2 and 3 may be preformed so that when assembled they will form a bolt such as shown in Fig. 3.

In use, the bolts are inserted in the usual manner and the non-headed end is heated with a blow-pipe torch, or by other suitable means. A heading tool is applied to the heated end to upset it and form the head 6. The formation of this head preferably does not destroy the separateness of the bolt members at this part of the bolt.

The two bolt members being entirely separate from end to end, they are capable of a slight movement relatively to each other under stresses in service, this tending to prevent elongation of the body of the bolt between the heads.

The twisting of the members upon each other not only increases the tensile strength of the bolt as a whole, but it also gives an element of elasticity to the bolt which tends to prevent permanent stretching thereof.

In the modification shown in Fig. 4, the two members 7 of the bolt are not entirely separated at the head 8, the separation extending only to or slightly into the head or shoulder portion 9. This bolt is twisted, and in use is upset to form a head at the opposite end, as in the form first described. While I consider this modification within the scope of my invention, I prefer to have the bolt members separate from each other from end to end of the bolt.

While I have shown and described, and prefer to use, a bolt of two members, I do not desire to limit myself thereto, since a greater number may be employed.

I claim:

1. A bolt having a plurality of members which are separate throughout the entire length of the bolt, said members being upset at both ends to form heads, the body of the bolt being twisted about its longitudinal axis intermediate said heads and a plurality of members through which the body members of the bolt extend and which are held in position with relation to each other by means of the heads, substantially as described.

2. A bolt formed of two similar helical members each having a head portion at one end, the other end of each of said members being arranged to be upset to form another head portion; substantially as described.

3. A bolt formed of a plurality of body members having a head at one end, an intermediate twisted portion, and a plain unthreaded portion at the opposite end which can be upset to form another head, the line of division between the two members extending through at least the major portion of the bolt, substantially as described.

4. A bolt formed of a plurality of members, having a head at one end, an intermediate twisted portion, and a plain unthreaded portion at the opposite end which can be upset to form another head, the line of division between the two members extending through the entire length of the bolt, substantially as described.

In testimony whereof, I have hereunto set my hand.

JOSEPH A. FRAUENHEIM.

Witnesses:
GEO. B. BLEMING,
W. C. LYON.

Copies of this patent may be obtained for five cents each, by addressing the "Commissioner of Patents, Washington, D. C."